United States Patent
Samborn et al.

(10) Patent No.: US 10,611,055 B2
(45) Date of Patent: Apr. 7, 2020

(54) GEAR BOX WITH VARIABLY COUPLED OSCILLATION AND ROTATION FOR KNEADING MACHINE

(71) Applicant: B&P Littleford LLC, Saginaw, MI (US)

(72) Inventors: Scott Lee Samborn, Freeland, MI (US); Douglas J. Marsh, Bay City, MI (US); John E. Kress, Hemlock, MI (US); Gonzalo Marilanda Paz, Saginaw, MI (US)

(73) Assignee: B&P Process Equipment and Systems LLC, Saginaw, MI (US)

( * ) Notice: Subject to any disclaimer, the term of this patent is extended or adjusted under 35 U.S.C. 154(b) by 0 days.

(21) Appl. No.: 15/457,409

(22) Filed: Mar. 13, 2017

(65) Prior Publication Data

US 2017/0297226 A1    Oct. 19, 2017

Related U.S. Application Data

(60) Continuation of application No. 14/454,242, filed on Aug. 7, 2014, now Pat. No. 9,592,624, which is a
(Continued)

(51) Int. Cl.
*B29B 7/36* (2006.01)
*B29C 45/50* (2006.01)
(Continued)

(52) U.S. Cl.
CPC .............. *B29B 7/36* (2013.01); *A21C 1/1465* (2013.01); *B01F 7/082* (2013.01); *B01F 7/085* (2013.01);
(Continued)

(58) Field of Classification Search
CPC .... A21C 1/1465; B01F 11/0057; B01F 7/082; B01F 7/085; B29B 7/36; B29B 7/80;
(Continued)

(56) References Cited

U.S. PATENT DOCUMENTS 2,547,151 A * 4/1951 Braeseke ................ B29C 45/03
366/81
2,629,132 A * 2/1953 Willcox ................. B29C 45/50
100/904
(Continued)

*Primary Examiner* — Tony G Soohoo
(74) *Attorney, Agent, or Firm* — Nexsen Pruet LLC; John B. Hardaway, III

(57) ABSTRACT

A gear box for a reciprocating kneader. A primary rotational gear is attached to a gear box primary shaft and rotates in concert therewith. A secondary rotational gear is engaged with the primary rotation gear and rotates therewith. A secondary shaft is attached to the secondary rotational gear and rotates therewith. A primary oscillation gear is attached to the gear box primary shaft and rotates therewith. A secondary oscillation gear is rotationally engaged with the primary oscillation gear and rotates on the secondary shaft. An eccentric is coupled to the secondary oscillation gear and rotates in concert therewith. A yoke is engaged with the eccentric and oscillates on an axis perpendicular to the secondary shaft in response to the lobe. The gearbox secondary shaft moves along its axis in concert with yoke oscillation. A housing is pivotally attached to the yoke and pivotally attached to a casing at a casing.

3 Claims, 9 Drawing Sheets

Related U.S. Application Data division of application No. 12/857,001, filed on Aug. 16, 2010, now Pat. No. 8,807,825.

(51) Int. Cl.

| | | |
|---|---|---|
| *B01F 7/08* | (2006.01) | |
| *B01F 11/00* | (2006.01) | |
| *F16H 37/16* | (2006.01) | |
| *F16H 25/12* | (2006.01) | |
| *A21C 1/14* | (2006.01) | |
| *B29B 7/80* | (2006.01) | |

(52) U.S. Cl.
CPC ............ *B01F 11/0057* (2013.01); *B29B 7/80* (2013.01); *B29C 45/50* (2013.01); *F16H 25/125* (2013.01); *F16H 37/16* (2013.01); *B29C 2045/5084* (2013.01); *Y10T 74/18024* (2015.01); *Y10T 74/19642* (2015.01)

(58) Field of Classification Search
CPC ............ B29C 2045/5084; B29C 45/50; F16H 25/125; F16H 37/16
See application file for complete search history.

(56) References Cited

U.S. PATENT DOCUMENTS

| | | | | | |
|---|---|---|---|---|---|
| 2,801,237 | A | * | 7/1957 | Clevy | C08B 17/02 366/332 |
| 2,916,769 | A | * | 12/1959 | Baigent | B29C 45/50 417/206 |
| 3,115,681 | A | * | 12/1963 | Hendry | B29C 45/1775 198/657 |
| 3,133,316 | A | * | 5/1964 | Arpajian | B29C 45/50 425/151 |
| 3,219,320 | A | * | 11/1965 | Sutter | B29B 7/423 366/289 |
| 3,224,739 | A | * | 12/1965 | Schuur | B01F 11/0057 366/321 |
| 3,253,818 | A | * | 5/1966 | Seddon | B01J 19/20 366/142 |
| 3,281,899 | A | * | 11/1966 | Dacco | B29C 45/164 222/142 |
| 3,285,163 | A | * | 11/1966 | Burner | B29C 47/38 100/117 |
| 3,317,962 | A | * | 5/1967 | Morse | B29C 45/47 366/78 |
| 3,443,446 | A | * | 5/1969 | Buergel | F16H 25/125 74/22 R |
| 3,456,298 | A | * | 7/1969 | Foster | B29C 45/50 264/40.5 |
| 3,570,588 | A | * | 3/1971 | Wheeler | B01F 15/063 165/120 |
| 3,728,053 | A | * | 4/1973 | Stillhard | B29C 44/0492 264/328.6 |
| 3,734,667 | A | * | 5/1973 | Dray | B29C 45/50 425/135 |
| 3,788,609 | A | * | 1/1974 | Toczyski | B01F 11/0057 366/289 |
| 3,802,278 | A | * | 4/1974 | Loomans | B01F 11/0057 464/162 |
| 3,855,869 | A | * | 12/1974 | Dimitrov | B23Q 5/323 74/22 R |
| 3,862,551 | A | * | 1/1975 | Loomans | B01F 11/0054 403/59 |
| 3,908,968 | A | * | 9/1975 | Bielfeldt | B29C 45/5008 366/78 |
| 4,004,788 | A | * | 1/1977 | Ronner | B29B 7/423 366/80 |
| 4,099,899 | A | * | 7/1978 | Gunnell | C09C 1/58 264/117 |
| 4,223,600 | A | * | 9/1980 | Adarraga | B30B 9/124 100/37 |
| 4,538,917 | A | * | 9/1985 | Harms | B29C 47/38 366/324 |
| 4,573,799 | A | * | 3/1986 | Anders | B29C 47/0871 366/323 |
| 4,976,904 | A | * | 12/1990 | Bilhorn | B29C 47/10 264/104 |
| 5,089,178 | A | * | 2/1992 | Passoni | A47J 43/122 261/59 |
| 5,178,461 | A | * | 1/1993 | Taniguchi | B01F 11/0057 366/307 |
| 6,431,755 | B1 | * | 8/2002 | Schneider | B29C 47/0801 366/100 |
| 7,070,318 | B2 | * | 7/2006 | Renfro | B01F 7/1695 366/143 |
| 8,807,825 | B2 | * | 8/2014 | Samborn | B01F 7/082 366/100 |
| 9,592,624 | B2 | * | 3/2017 | Samborn | B01F 7/082 |
| 2007/0140054 | A1 | * | 6/2007 | Stocker | F16D 1/108 366/331 |
| 2007/0171767 | A1 | * | 7/2007 | Huang | A23G 9/045 366/289 |
| 2007/0183253 | A1 | * | 8/2007 | Siegenthaler | B29B 7/423 366/80 |
| 2009/0027994 | A1 | * | 1/2009 | Grutter | B29B 7/423 366/79 |
| 2012/0039145 | A1 | * | 2/2012 | Samborn | B01F 7/082 366/78 |
| 2014/0102232 | A1 | * | 4/2014 | Samborn | B01F 7/082 74/22 R |
| 2015/0124551 | A1 | * | 5/2015 | Samborn | B01F 7/082 366/78 |

\* cited by examiner

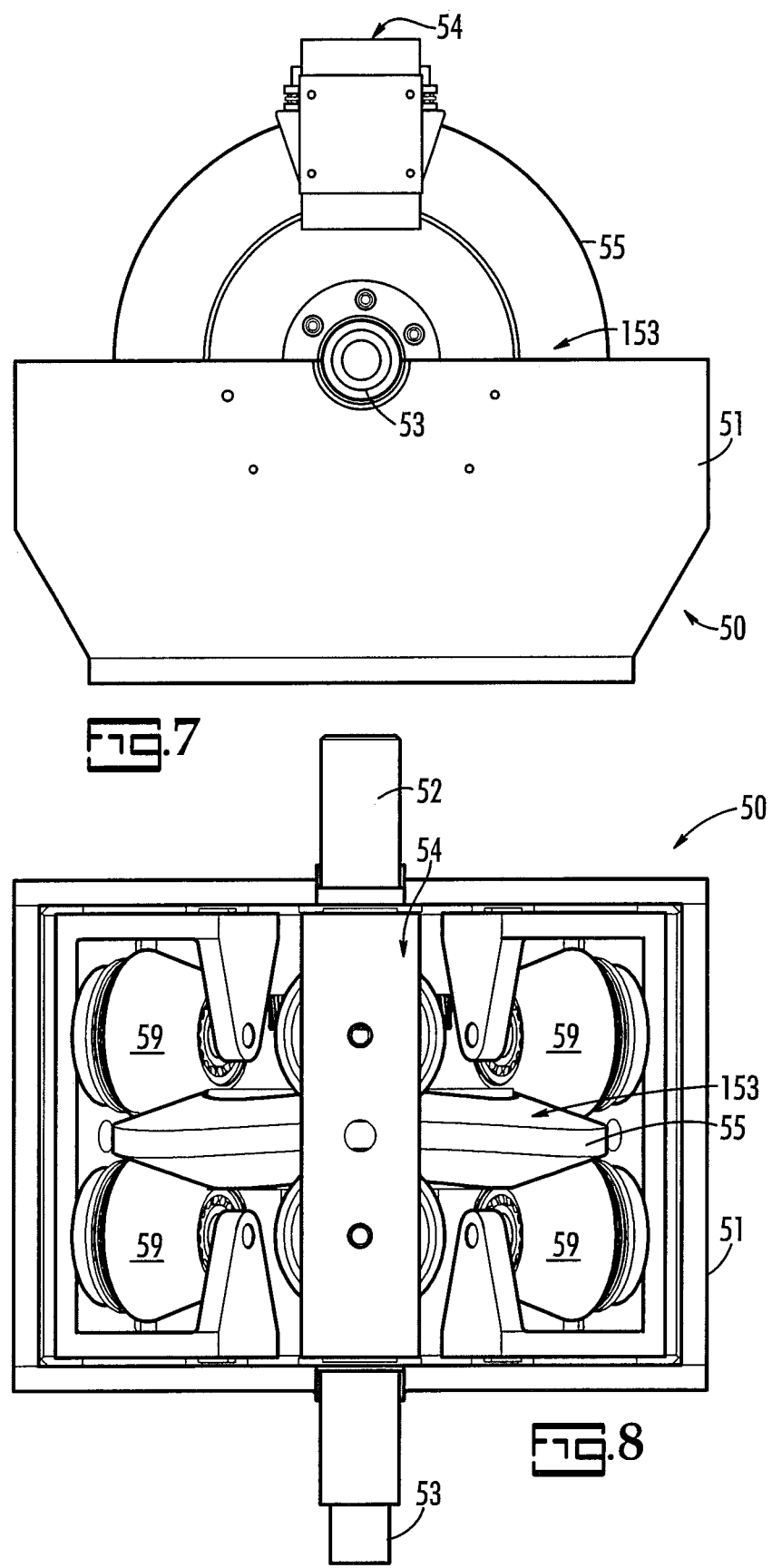

GEAR BOX WITH VARIABLY COUPLED OSCILLATION AND ROTATION FOR KNEADING MACHINE

BACKGROUND

The present invention is related to a gear box for a kneading machine which allows coupled oscillation and rotation from a single drive wherein the oscillation strokes per revolution is adjustable but invariant at a given adjustment.

Kneading machines are widely used in a variety of applications. In general, kneading machines can be categorized as either rotational only or rotational and oscillatory. The present application is related to a kneader capable of rotating and oscillating which is also referred to in the art as a reciprocating kneader.

A critical design feature of a reciprocating kneader is the relationship between the rotation and the oscillation. For convenience in the art this is referred to as "stroke ratio" which is the number of oscillations, or translations parallel to the rotational axis, per rotation of the axis. For example, a stroke ratio of 1 would indicate that the oscillation starts at an initial point, moves through the entire range of motion and returns to the starting point during a single rotation. This range of motion is referred to as "stroke length". With a stroke ratio of 2 the oscillation would occur twice with a single rotation. The stroke ratio can be a whole number or in some instances it may be a fraction, such as 2.5, wherein five oscillations would occur with two rotations.

The screw design and, if present, pin arrangement define the stroke ratio and stroke length requirements of a reciprocating kneader. If the stroke ratio and stroke length is not matched to the screw design and pin arrangement the screw flights and pins may collide in catastrophic fashion. As a result, reciprocating kneaders have been considered relatively inflexible with regards to design changes. Reciprocating kneaders are typically designed for a specific application and the design choice often limits the materials which can be kneaded in an existing kneader.

As would be realized the rotation and oscillation can be adjusted by using separate drive mechanisms yet this approach has a high failure rate. If one drive mechanism varies, even slightly, the rotation and oscillation lose their synchronous motion which leads to collisions of flights and pins with catastrophic results. Therefore, it is highly desirable that the rotation and oscillation have a common drive to avoid the potential for stroke ratio variability.

It has been a long standing desire to provide a reciprocating kneader wherein the stroke ratio can be easily modified thereby allowing for variation in the combination of screw and pin. This would allow a single unit to be used for many different applications simply by inserting a different screw, using a different pin arrangement and adjusting the stroke ratio and stroke length in accordance with the choice of screw and pin. Unfortunately, such equipment has been limited by the lack of a suitable gearbox. This long standing problem has been alleviated by the present invention.

SUMMARY

It is an object of the present invention to provide a reciprocating kneader which allows for altering the stroke ratio.

It is another object of the present invention to provide a gear box which is particularly suitable for use with a reciprocating kneader wherein the stroke ratio in addition to stroke length can be easily altered thereby allowing for flexibility in screw and pin combinations.

A particular feature of the present invention is the ability to utilize a single drive thereby insuring that the stroke ratio is invariant with regards to rotation rate.

These and other features, as will be realized, are provided in a gear box for a reciprocating kneader. The gear box has a gear box primary shaft adapted for coupling to a motor. A primary rotational gear is attached to the gear box primary shaft and rotates in concert with the gear box primary shaft. A secondary rotational gear is engaged with the primary rotation gear and rotates in concert with the primary rotational gear. A gear box secondary shaft is attached to the secondary rotational gear and rotates in concert with the secondary rotational gear. A primary oscillation gear is attached to the gear box primary shaft and rotates in concert with the gear box primary shaft. A secondary oscillation gear is engaged with the primary oscillation gear and rotates in concert with the primary oscillation gear wherein the secondary oscillation gear rotates on the gear box secondary shaft. An eccentric comprising at least one lobe is coupled to the secondary oscillation gear and the eccentric rotates in concert with the secondary oscillation gear. A yoke is engaged with the eccentric wherein the yoke oscillates on an axis perpendicular to the gear box secondary shaft in response to contact with the lobe of the eccentric during rotation and the gearbox secondary shaft moves along its axis in concert with yoke oscillation. A housing is pivotally attached to the yoke at a yoke pivot axis and pivotally attached to a casing at a casing pivot axis herein the yoke pivot axis and the casing pivot axis are not parallel. A coupling is on the gear box secondary shaft and adapted for attachment to a kneader.

Yet another embodiment is provided in a reciprocating kneader. The reciprocating kneader has a kneader with a cylindrical casing. A screw extends into the cylindrical casing wherein the screw has flights and pins extending into the cylindrical casing. A gear box is provided. The gear box has a gear box primary shaft adapted for coupling to a motor. A primary rotational gear is attached to the gear box primary shaft and rotates in concert with the gear box primary shaft. A secondary rotational gear is engaged with the primary rotation gear and rotates in concert with the primary rotational gear. A gear box secondary shaft is attached to the secondary rotational gear and rotates in concert with the secondary rotational gear. A primary oscillation gear is attached to the gear box primary shaft and rotates in concert with the gear box primary shaft. A secondary oscillation gear is engaged with the primary oscillation gear and rotates in concert with the primary oscillation gear wherein the secondary oscillation gear rotates on the gear box secondary shaft. An eccentric, comprising lobes, is coupled to the secondary oscillation gear wherein the eccentric rotates in concert with the secondary oscillation. A yoke is engaged with the eccentric wherein the yoke oscillates on an axis perpendicular to the gear box secondary shaft in response to contact with the lobes of the eccentric during rotation and the gearbox secondary shaft moves along its axis in concert with yoke oscillation. A housing is pivotally attached to the yoke at a yoke pivot axis and pivotally attached to the casing at a casing pivot axis herein the yoke pivot axis and the casing pivot axis are not parallel. The gear box secondary shaft is coupled to the screw such that the screw moves in concert with movement of the gear box secondary shaft. A motor is coupled to the gear box primary shaft.

Yet another embodiment is provided in a gear box for a reciprocating kneader. The gear box has a casing with a primary shaft extending through the casing. A roller plate is attached to the primary shaft wherein the roller plate has circumferentially symmetrically placed deviations from planarity. At least one roller assembly is attached to the casing and engaged with the roller plate. Rotation of the roller plate causes the primary shaft to move parallel to rotation relative to the casing in response to engagement between the roller plate and the roller assembly.

BRIEF DESCRIPTION OF THE FIGURES

FIG. 7 is a side view of an embodiment of the invention.

FIG. 8 is a top view of an embodiment of the invention.

DETAILED DESCRIPTION

The present invention is directed to a reciprocating kneader and, particularly, a reciprocating kneader wherein the stroke ratio can be altered to accommodate various screw/pin combinations with minimal effort. More particularly, the present invention is directed to a gear box which is particularly suitable for use with a reciprocating kneader.

The present invention will be described with reference to the figures which are an integral, but non-limiting, part of the instant specification. Throughout the description similar elements will be numbered accordingly.

Figure 1:
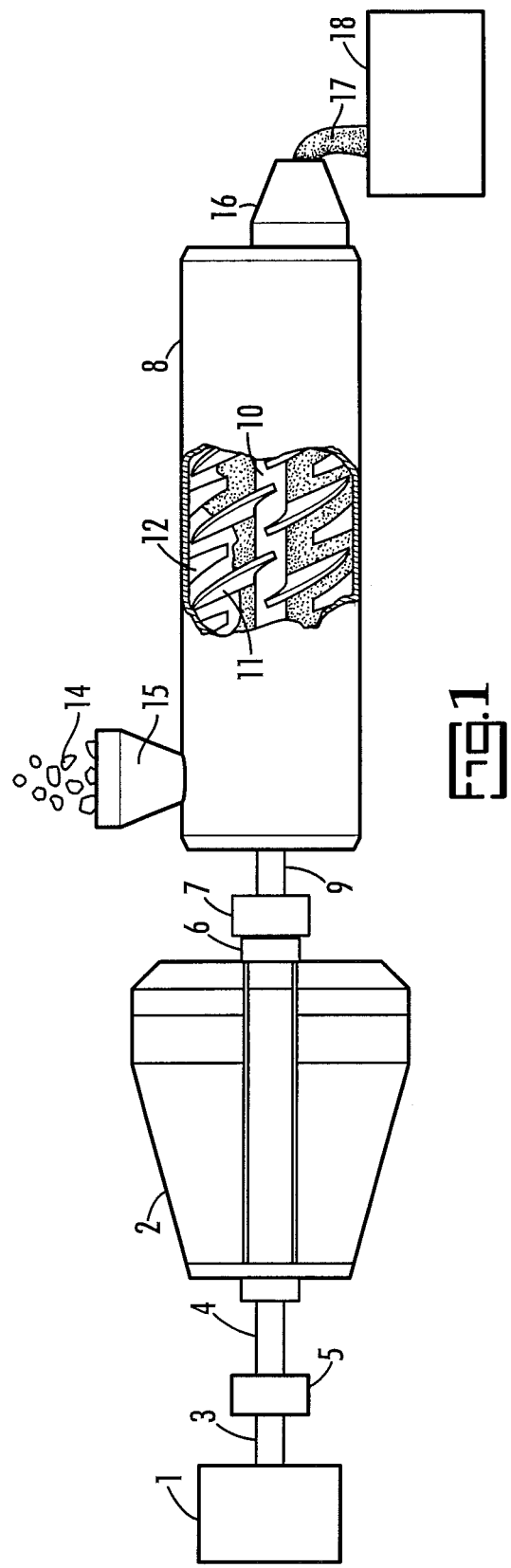
FIG. 1 is a schematic partial cut-away view of an embodiment of the invention.

An embodiment of the invention is illustrated in schematic partial cut-away view in FIG. 1. In FIG. 1, a drive motor, 1, having a motor drive shaft, 3, is the primary source of power for the gear box, 2. The motor drive shaft is coupled to a gear box primary shaft, 4, by a primary shaft couple, 5. The motor, which is not limited herein, may be directly coupled, as illustrated, or coupled through a mechanism such as a transmission, gear assembly, belt assembly or the like without limit herein. For the purposes of the present invention the drive motor is arranged to rotate the gear box primary shaft.

The gear box, 2, which will be described more fully herein, has an output coupler, 6, which is coupled to an kneader input shaft, 7, of a reciprocating kneader, 8, by a kneader shaft couple, 9. The kneader shaft couple insures that the rotation and oscillation of the output coupler is translated to the kneader input shaft. The reciprocating kneader comprises a screw, 10, with a multiplicity of flights, 11, thereon. As the screw rotates and oscillates the flights pass by pins, 12, in close proximity thereby providing the kneading function. Precursor material, 14, enters a hopper, 15, wherein it passes into the kneader and exits, optionally through an extrusion die, 16, as extrudate, 17, for collection in a bin, 18.

Figure 2:
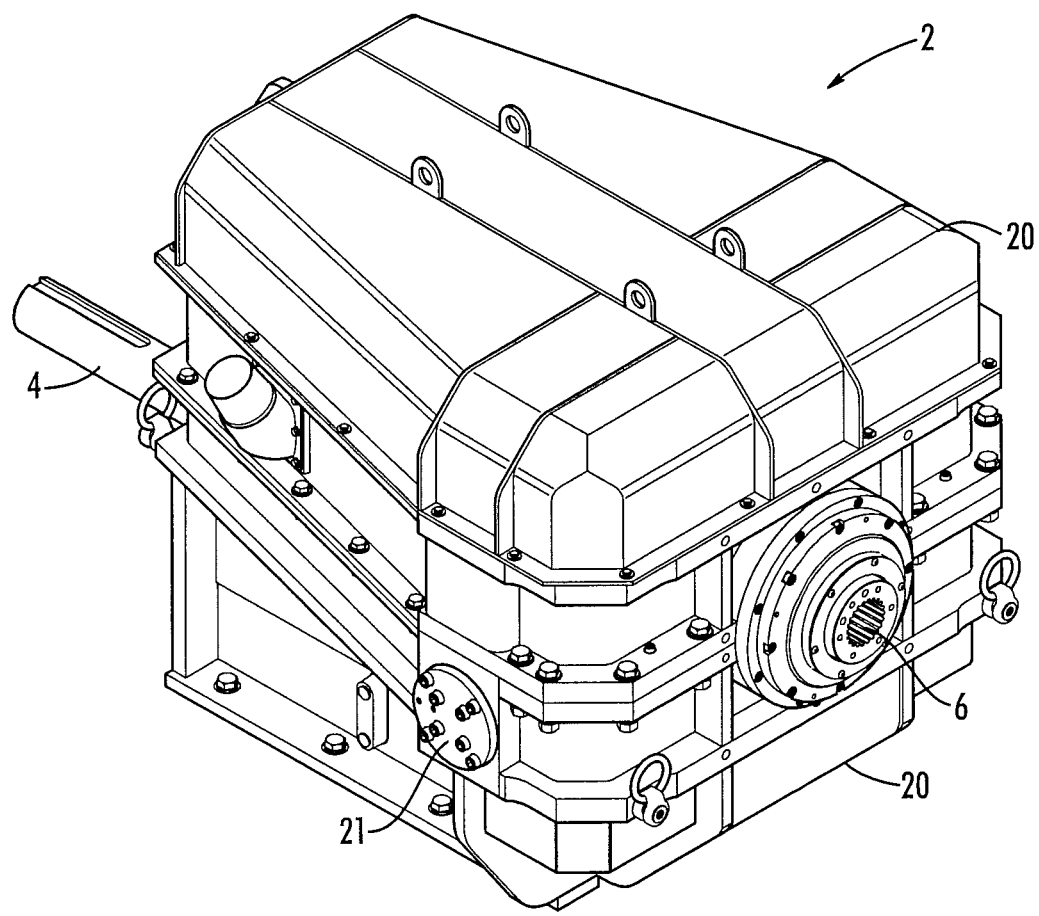
FIG. 2 is a schematic perspective view of an embodiment of the invention.

The gear box, 2, is shown in isolated perspective view in FIG. 2. In FIG. 2, the gear box comprises upper and lower casing members, 20, suitable for mounting to a frame member, not shown, as would be realized. The gear box primary shaft, 4, extends from the rear of the gear box and the output coupler, 6, is accessible on the front of the gear box for coupling thereto. Casing bearings are not further described since these would be readily understood to be appropriate and the design thereof is not particularly limiting.

A pivot pin flange, 21, is on either side of the casing the purpose of which will be more fully understood after further discussion.

Figure 3:
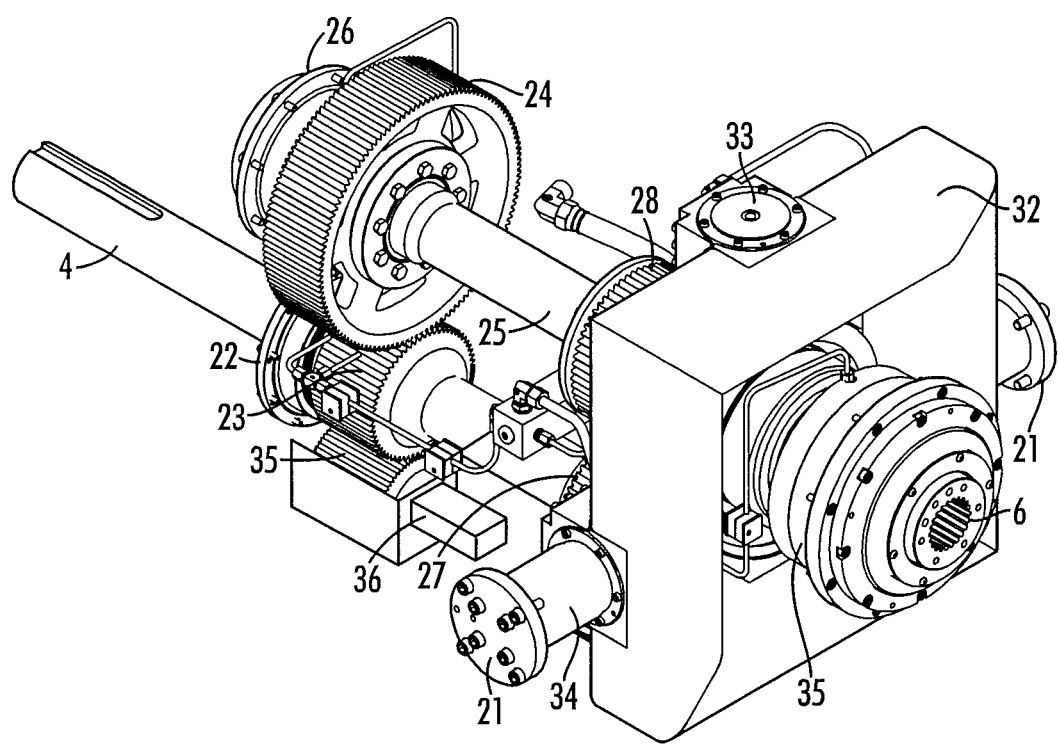
FIG. 3 is a schematic front perspective view of an embodiment of the invention.
Figure 4:
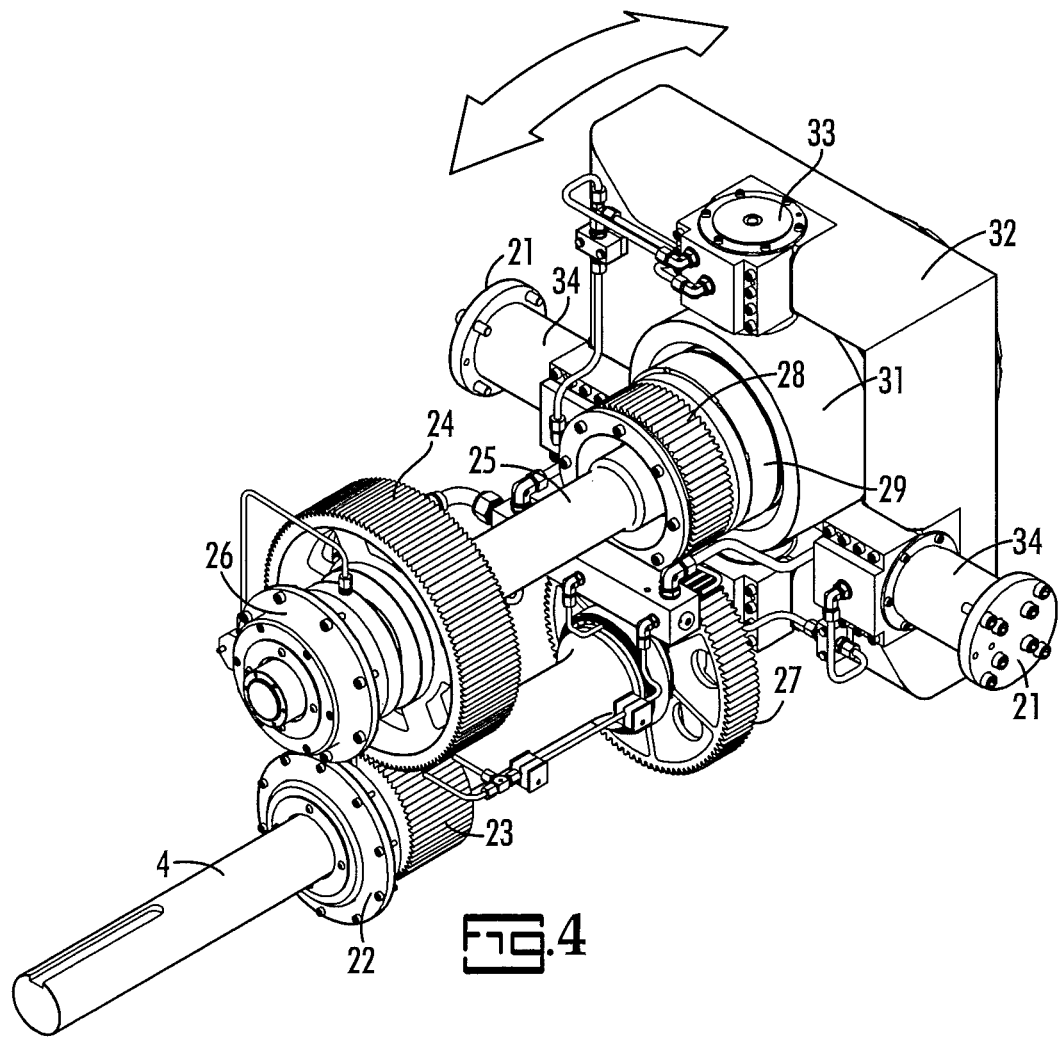
FIG. 4 is a schematic back perspective view of an embodiment of the invention.

An embodiment of the internal components of the gear box is illustrated in front perspective view in FIG. 3 and another embodiment is illustrated in rear perspective in FIG. 4 with the casing removed in both views for clarity.

The gear box primary shaft, 4, drives rotation and oscillation in concert. A bearing, 22, supports the gear box primary shaft in the housing as would be readily appreciated. A primary rotational gear, 23, is secured to, and driven by, the gear box primary shaft. The primary rotational gear engages with a secondary rotational gear, 24, thereby providing rotation to a gear box secondary shaft, 25. The gear box secondary shaft is preferably parallel to the gearbox primary shaft. The gear ratio of the primary rotational gear to the secondary rotational gear determines the rate of rotation of the gear box secondary shaft, 25, relative to the gear box primary shaft, 4. The gear box secondary shaft is supported by a bearing, 26, which engages with the casing.

A primary oscillation gear, 27, is secured to, and driven by, the gear box primary shaft. The primary oscillation gear engages with a secondary oscillation gear, 28, which rotates freely on the gear box secondary shaft, 25. The secondary oscillation gear drives an eccentric, 29. The eccentric, 29, has lobes, 30.

Figure 5:
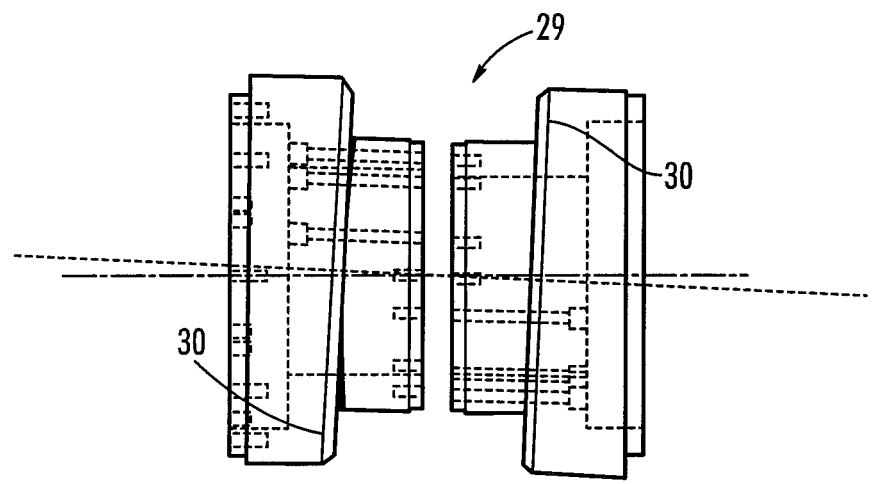
FIG. 5 is a schematic side view of an embodiment of the invention.

The eccentric is more readily visualized in FIG. 5 wherein the eccentric is illustrated in isolated view for clarity.

A yoke, 31, rides on the eccentric. As the eccentric rotates the yoke transfers the pattern of the lobe to a housing, 32. The yoke pivots on a secondary pivot axis, 33, within the housing and the housing pivots on a primary pivot sleeve, 34, which is secured to the casing by bearings (not shown) and bound by the pivot pin flange, 21. The primary pivot sleeve, 34, is offset relative to the gear box secondary shaft which causes the housing to oscillate back and forth along the arrow in FIG. 4 on the axis defined by the primary pivot sleeves. The length of the oscillation, defined at the axis of the gear box secondary shaft, is dependent on the angle of the lobes on the eccentric and the distance between the primary pivot sleeve and the axis of the gear box secondary shaft. In general, the stroke length increases as the angle of the eccentric increases and as the distance from the center line of the gear box secondary shaft to the primary pivot sleeve increases. A preferred output coupler bearing housing, 35, contains the output coupler, 6, and provides an attachment point for the kneader.

As would be apparent from the description the secondary oscillation gear and eccentric may rotate at a different rate than the gear box secondary shaft. Therefore, they must rotate freely on the gear box secondary shaft and be free to move along the gear box secondary shaft.

A tertiary gear, 35, as illustrated in FIG. 3, may function as an idler roller or it may turn an oil pump, 36, or other auxiliary equipment, diagnostic equipment or the like. Auxiliary equipment and diagnostic equipment may include lubrication monitors, tachometers, hour monitors and the like.

Figure 6:
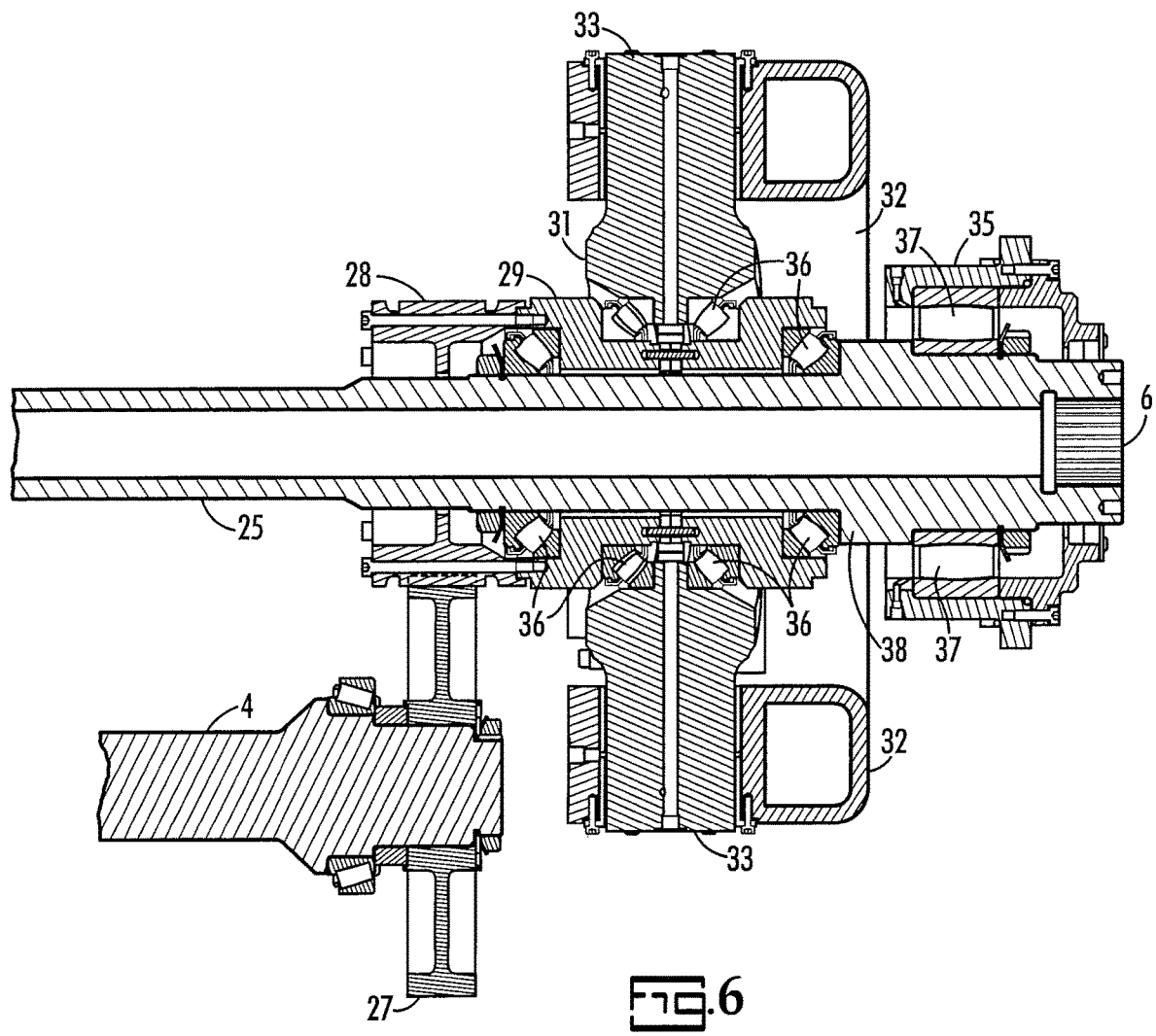
FIG. 6 is a schematic cross-sectional side view of an embodiment of the invention.
Figure 9:
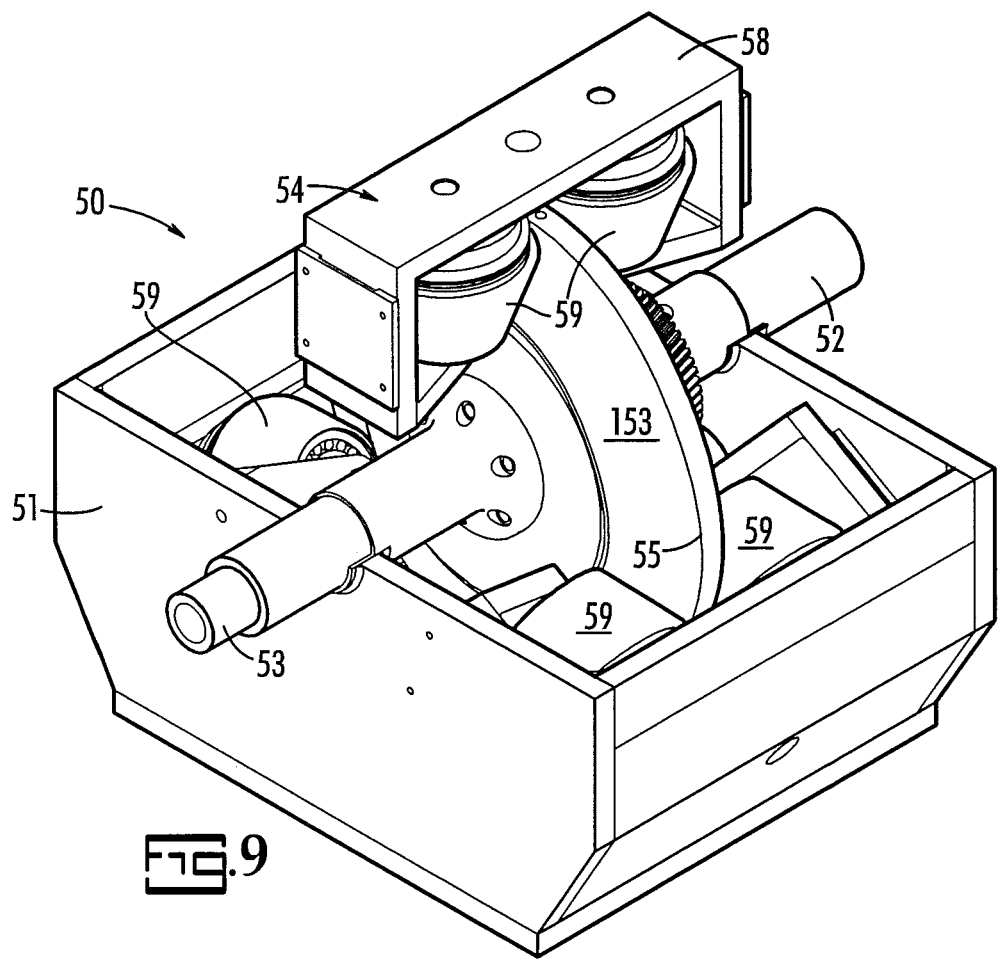
FIG. 9 is a perspective view of an embodiment of the invention.
Figure 10:
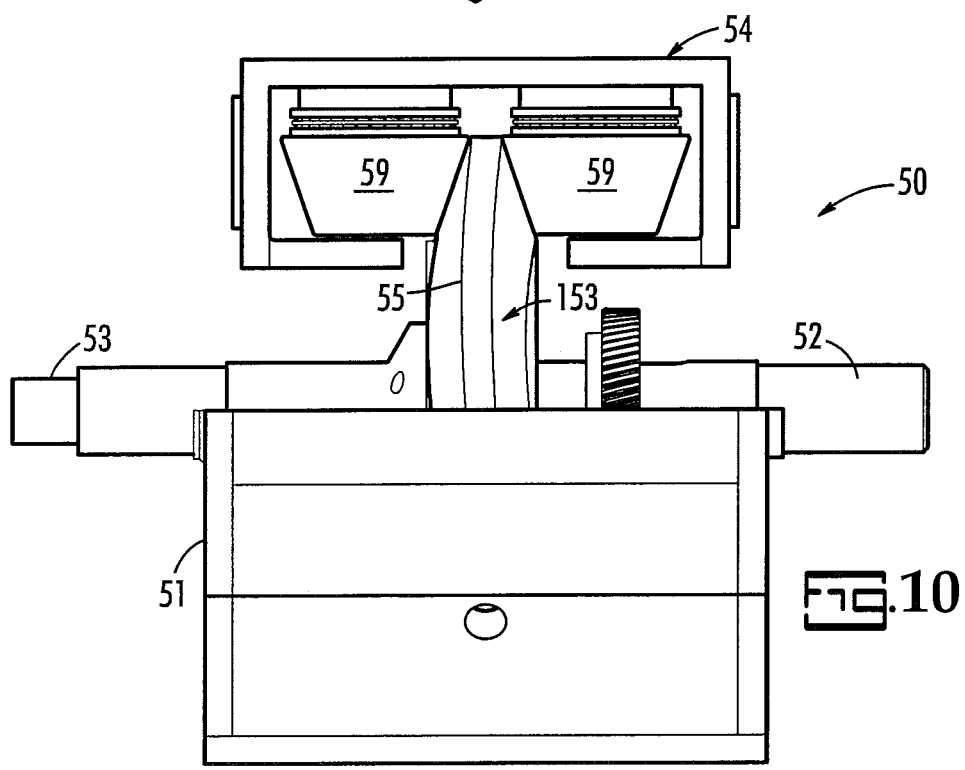
FIG. 10 is a front view of an embodiment of the invention.

A portion of the internal components of the gear box is illustrated in cross-sectional side schematic view in FIG. 6. As illustrated in FIG. 6, the eccentric, 29, rotates freely on the gear box secondary shaft, 25. It is preferable that the eccentric and gear box secondary shaft have secondary shaft bearings, 36, there between to reduce rotational friction between the shaft and a land, 38, of the gear box secondary shaft. The secondary shaft bearings are preferably spherical roller thrust bearings.

It is preferably that the output coupler, 6, and output coupler bearing housing, 35, have a coupler housing bearing, 37, there between to reduce rotational friction. A particularly preferred coupler housing bearing is a toroidal bearing.

Toroidal bearings have a single row of bearings with long, slightly crowned symmetrical rollers. The raceways of both the inner and outer rings are concave and situated symmetrically about the bearing center. Toroidal bearings are particularly preferred due to their self-aligning and axial displacement properties. Toroidal bearings are available as CARB® toroidal roller bearings from SKF Corporation.

A feature of the present invention is the constant correlation of rotation and oscillation thereby prohibiting catastrophic contact between flights and pins. As would be realized the primary rotational gear and primary oscillation gear are secured to the gear box primary shaft in such a way that they do not rotate on the gear box primary shaft independent of each other. The primary rotational gear and primary oscillation gear are preferably reversibly attached to the gear box primary shaft by keyways, mating surface shapes, threaded members and the like. Likewise, the union between the primary rotation gear and secondary rotation gear, the union between the primary oscillation gear and secondary oscillation gear, the union between the secondary rotation gear and the gear box secondary shaft and the union between the secondary oscillation gear and eccentric are preferably unions which prohibit slip. Belts can be incorporated but are not preferred unless they are a toothed belt, with protrusion on the inside, mated with a geared wheel. Mating primary and secondary gears such as toothed gears are a preferred embodiment. Chain assemblies are another preferred embodiment.

A particular feature of the invention is the ability to change the stroke. The stroke length can be changed by replacing the eccentric. The stroke ratio can be changed by changing the gear ratio of the primary oscillation gear to secondary oscillation gear, by changing the gear ratio of the primary rotation gear to secondary rotational gear or combinations thereof.

By way of example, with reference to FIG. 4, the rotation rate of the gear box primary shaft, 4, is determined by the motor attached thereto. For the purposes of illustration a rotation rate of the gear box primary shaft of 1800 rpm is considered. The rotation rate of the screw within the kneader will be the same as the rotation rate of the gear box secondary which is determined by the gear ratio of the primary rotation gear to the secondary rotation gear. For example, a gear ratio of the secondary rotational gear to the primary rotational gear could be 2:1 thereby providing a rotation rate for the gear box secondary shaft which is half of the rotation rate of the gear box primary shaft. In the illustrative example the rotation rate of the kneader screw would be 900 rpm.

The oscillation rate of the screw would be determined by the number of lobes on the eccentric and the rotation rate of the eccentric. For illustration purposes, the eccentric may have a single lobe wherein one rotation of the eccentric creates one oscillation of the screw. The oscillation rate would therefore be determined by the rotation rate of the eccentric. The eccentric is coupled to the gear box primary shaft and defined by the ratio of the primary oscillation gear to the secondary oscillation gear. Again for illustration purposes, if the ratio of the primary oscillation gear to the secondary oscillation gear is 1.5:1 the eccentric rotates at a rate of 2700 rpm which is three times that of the gear box secondary shaft. The result in this example is 3 oscillations per rotation for a stroke ratio of 3.

A particular feature of the invention is that the stroke ratio is invariant to motor speed or the rotational rate of the gear box primary shaft thereby eliminating collision opportunities within the kneader. Any disturbance in speed of the motor such as by power supply fluctuations/would result in a change in the rotation rate of the kneader screw and rate of oscillations but there would be no alteration in the stroke ratio.

One of skill in the art could determiner or definer a stroke ratio using common engineering principles based on the teachings herein.

Another embodiment of the inventive gearbox is illustrated in schematic partial view in FIGS. 7-10. In FIGS. 7-10 the lower casing, 51, is illustrated and the upper casing is removed for clarity. The gearbox, 50, is illustrated in front view in FIG. 7, top view in FIG. 8, perspective side view in FIG. 9, and side view in FIG. 10.

The gear box 50, comprises a primary shaft 52, which is continuous through the gear box. A motor attaches to the primary shaft at a sliding couple, 53. The sliding coupling couples the rotation of the primary shaft to the motor while allowing the primary shaft to oscillate parallel to the motor shaft. The sliding couple may be a direct connection between the motor and primary shaft or it may be an offset couple employing gears, pulleys, chains, a transmission or the like.

Attached to the primary shaft is a roller plate, 53. The roller plate comprises deviations from planarity which are symmetrically placed circumferentially. It is particularly preferred that the deviations from planarity are on opposing sides of the center plane of the roller in a sinusoidal fashion. It is particularly preferred that the edge, 55, have a sin(sin (x)) sinusoidal pattern. In another preferred embodiment, assuming the z axis of the roller plate is the rotational axis, the parametric equations for the preferred plate geometry is:

$$X=R*\cos(t)$$

$$Y=R*\sin(t)$$

$$Z=SL*\sin(SR*t)$$

where R=radius, SL=Stroke Length, and SR=Stroke Ratio and t is from 0 to 2*pi.

Roller assemblies, 54, attached to the casing, 51, are arranged at the same frequency as the deviations from planarity. The roller assembly comprises a bracket, 58, with rollers, 59, attached thereto. The bracket is secured to the casing. The rollers form a limited path for passage of the roller plate. As the roller plate passes through the rollers the primary shaft is persuaded to move parallel to the axis of rotation due to the force applied to the roller plate by the roller.

In FIGS. 7-10, the deviations from planarity are separated by 120 degrees as are the roller assemblies. As the primary shaft and roller plate rotate the shaft will be forced to move linearly relative to the roller assemblies, and casing, in response to the deviations from planarity.

Figure 11:
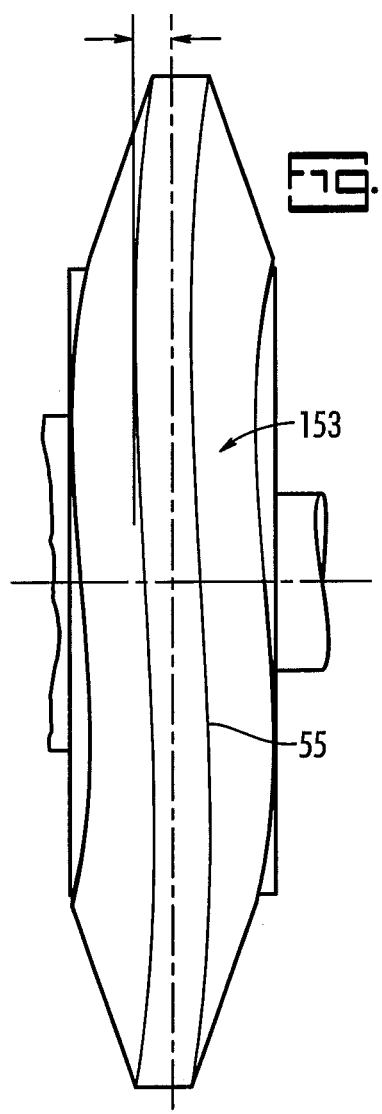
FIG. 11 is a side view of a portion of the FIG. 10 embodiment.

The number of occurrences of deviation from planarity determines the stroke of the gear box. A representative roller plate is illustrated in FIG. 11. In FIG. 11 three deviations are illustrated wherein the deviations are separated by 120°. A gear box with a roller plate as illustrated in FIG. 11 would generate 3 strokes per revolution. For the purposes of discussion deviations are defined based on the center line.

With two deviations, which would be separated by 180°, the gear box would generate 2 strokes per revolution. With four deviations, which would be separated by 90°, the gear box would generate four strokes per revolution. The length of each stroke would be determined by the amount of deviation from planarity. The larger the deviation from planarity the longer the stroke.

As would be realized the roller assemblies are arranged at fixed intervals based on the number of deviations. The number of roller assemblies is no more than one roller per deviation and they are placed symmetrically with the same frequency as the number of deviations. Alternatively, fewer roller assemblies can be employed than the number of deviations as long as they are disposed symmetrically in a manner which matches the frequency of deviation. By way of example, if the roller plate has four deviations they would be displaced at 90° intervals around the roller plate. Four roller assemblies could be used with the four roller plate deviations placed in 90° intervals. Alternatively, select roller assemblies could be eliminated. For example three roller assemblies could be used placed at intervals of 90°-90°-90°-180°. In another embodiment two roller assemblies could be used with spacings of 90° or 180° intervals. In another embodiment a single roller assembly could be used.

The kneader screw would be coupled to the primary shaft with a union which fixes the rotation and oscillation to the shaft.

Figure 12:
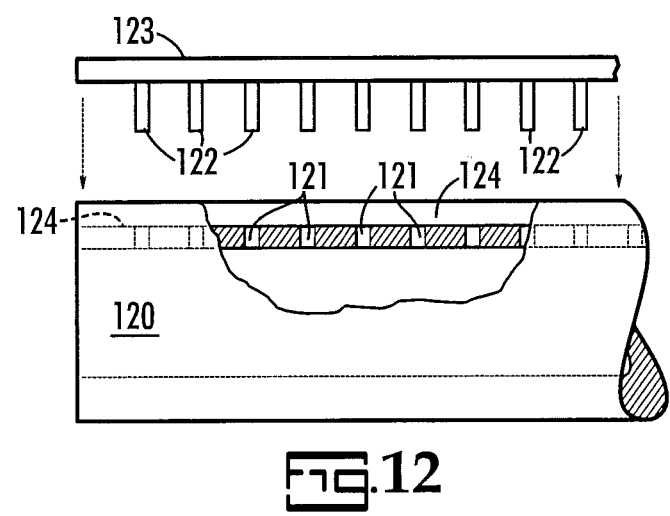
FIG. 12 is a partial view of a portion of the FIG. 10 embodiment.

A preferred embodiment of the kneader is illustrated in partial exploded cut-away view in FIG. 12. In FIG. 12, the mixing chamber, 120, comprises a multiplicity of voids, 121, through which pins, 122, extend. The pins are attached to a rail, 123. The rail, 123, preferably resides in a slot, 124, thereby maintaining an surface on the mixing chamber with minimum deviations from a round exterior. A particular advantage of the embodiment illustrated in FIG. 12 is the ability to insert a large number of pins simultaneously. The mixing chamber, 120, may be encased in an outer sleeve, either completely or partially, thereby securing the rail within the slot. Alternatively, the rail may be secured by threaded members. The pin rail may be installed on the interior of the mixing chamber but this is less preferred.

The screw may comprise a cylindrical screw shaft with continuous wings or portions of wings on the exterior thereof. The pitch of the wings may vary with length thereby providing different kneading characteristics along the flow path.

A particularly preferred screw will be described with reference to FIGS. 13 and 14 wherein illustrated are segmented flights.

Figure 13:
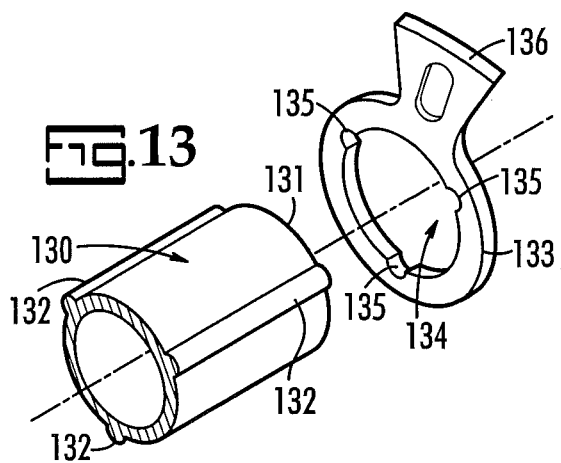
FIG. 13 is a perspective view of another embodiment of this invention.
Figure 14:
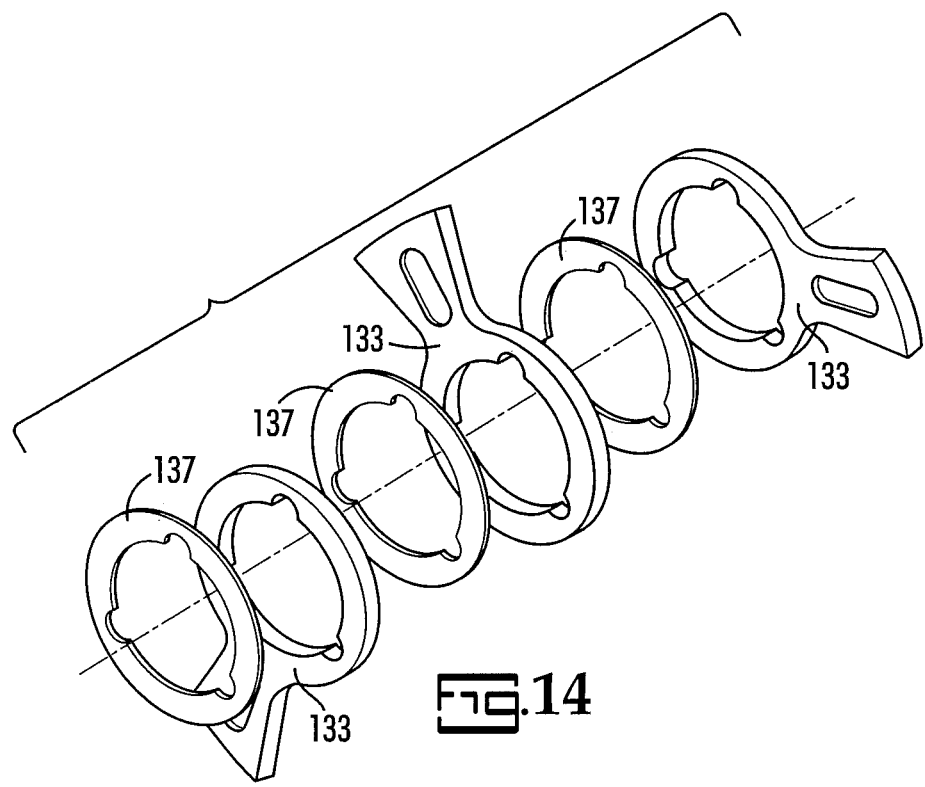
FIG. 14 is a perspective view of the embodiment illustrated in FIG. 13.

Focusing now on FIG. 13, a screw shaft, 130, comprises a cylindrical core, 131, with outward protrusions, 132, symmetrically attached thereto. A segmented flight, 133, slides on the screw shaft. The segmented flight, 133, has a center void, 134, which receives the cylindrical core of the screw shaft. Depressions, 135, in the center void mate with the protrusions to prohibit rotation of the segmented flight on the screw shaft. The segmented flight has a wing, 136, thereon which kneads the material, optionally, by passing into close proximity with pins as described above. It would be apparent from the description that the segmented flight can be placed in a limited number of rotational orientations based on the number of protrusions and depressions. As illustrated, the segmented flight can be placed in one of three rotational positions. An advantage of this is described with reference to FIG. 14 wherein three segmented flights, 133, are shown in exploded view as they would be oriented on a screw shaft. Each one is rotated 120° relative to the adjacent segmented flight. Spacers, 137, between segmented flights define the separation. By varying the thickness of the segmented flight, the pitch of the wing, and the spacers a great variety of kneading conditions can be established. Furthermore, a damaged flight can be easily replaced. While illustrated with protrusions on the shaft and matching depressions on the segmented flight this arrangement can be reversed.

Figure 15:
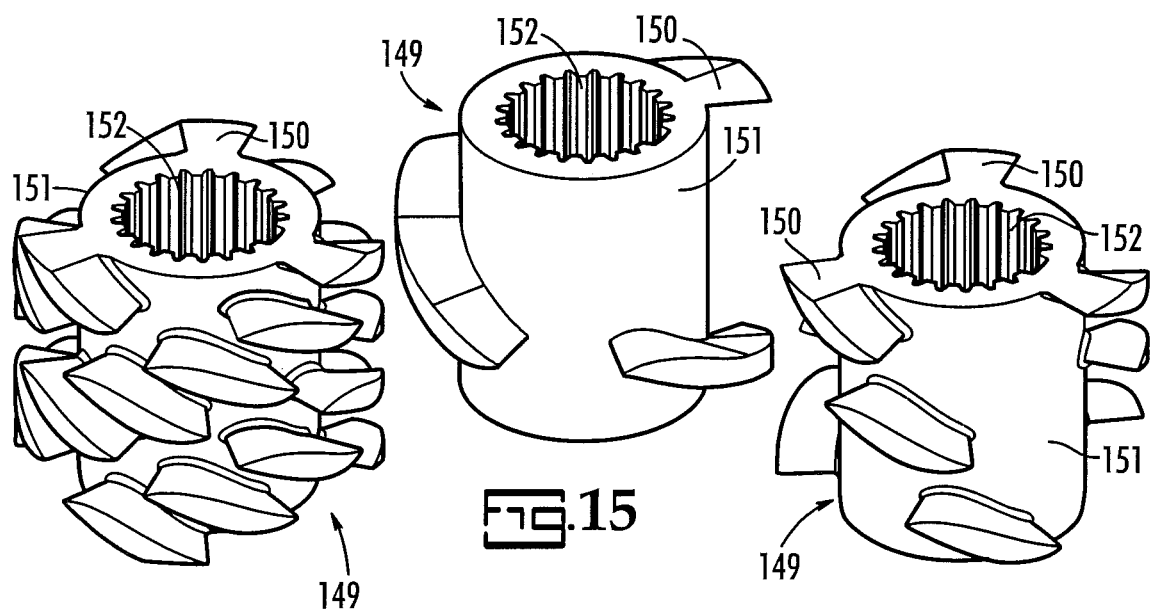
FIG. 15 is a perspective view illustrating multiple wing sleeves and wings.

Yet another embodiment of the screw will be described with reference to FIG. 15. In FIG. 15, multiple wing sleeves, 149, with each comprising multiple wings, 150, and multiple orientations are illustrated attached to a cylindrical core, 151. The cylindrical core is preferably placed on a shaft, not shown, wherein the shaft comprises teeth which mate with the teeth, 152, in the central cavity of the wing. As would be realized from the discussion herein the kneading pattern can be adjusted by the use of wing sleeves in various configurations.

The invention has been described with reference to the preferred embodiments without limit thereto. One of skill in the art would realize additional embodiments and alterations which are not specifically set forth herein but which are within the metes and bounds of the invention as more specifically set forth in the claims appended hereto.

The invention claimed is:

1. A process for kneading raw material in a kneader having a rotating screw with an axis of rotation within a cylindrical housing, said screw having a multiplicity of flights thereon intermeshed with stationary pins extending from said cylindrical housing, comprising the steps of: providing a source of rotation; rotating said screw by said source of rotation to move said raw material through said kneader such that said flights intermesh with said pins to knead said raw material; simultaneously reciprocating said screw from said source of rotation such that said flights pass between said pins both rotationally and translationally in a direction parallel to the axis of the screw; correlating said rotation and oscillation to prohibit contact between said flights and pins; said oscillation occurring at a rate of two or greater oscillations per rotation; said rate being invariant to the rotational speed of said screw.

2. The process according to claim 1 wherein the rate of oscillation per rotation is greater than two and a half oscillations per rotation.

3. The process according to claim 1 wherein the rate of oscillation per rotation is three.

* * * * *